United States Patent [19]

Yoneda

[11] 4,117,752
[45] Oct. 3, 1978

[54] EMERGENCY SYSTEM FOR STOPPING A BAND BLADE OF A CUTTING APPARATUS

[76] Inventor: Kichi Yoneda, 396, Tsutsui, Nantan-cho, Mihara-gun Hyogo Prefecture, Japan

[21] Appl. No.: 787,939

[22] Filed: Apr. 15, 1977

[30] Foreign Application Priority Data

May 25, 1976 [JP] Japan .............................. 51-67437[U]

[51] Int. Cl.² ............................................ B27G 19/00
[52] U.S. Cl. ........................................ 83/58; 83/62.1; 192/129 A
[58] Field of Search ..................... 83/58, 62, 62.1; 90/11 E; 192/129 A, 130, 144

[56] References Cited

U.S. PATENT DOCUMENTS

| | | | |
|---|---|---|---|
| 1,927,203 | 9/1933 | DeGroot | 83/62.1 |
| 3,595,132 | 7/1971 | Thacker | 90/11 E |
| 3,785,230 | 1/1974 | Lokey | 83/58 |
| 4,026,177 | 5/1977 | Lokey | 83/58 |

*Primary Examiner*—Donald R. Schran
*Attorney, Agent, or Firm*—Wenderoth, Lind & Ponack

[57] ABSTRACT

An emergency system for stopping the endless band blade reeved around a plurality of pulleys rotatably mounted on the base of a cutting apparatus. The system has a bearing rotatably mounted on the base and held in contact with the band blade at all times and an amplifier electrically connected to the band blade by the bearing. When the human body comes into contact with the band blade, the electric charge potential of the body is amplified by the amplifier and energizes relays which interrupt the current supply to the motor for driving the band blade and, at the same time, actuate an electromagnetic brake and an electromagnetic clamp brake to brake the pulley coupled to the motor and the band blade to immediately stop the band blade.

4 Claims, 5 Drawing Figures

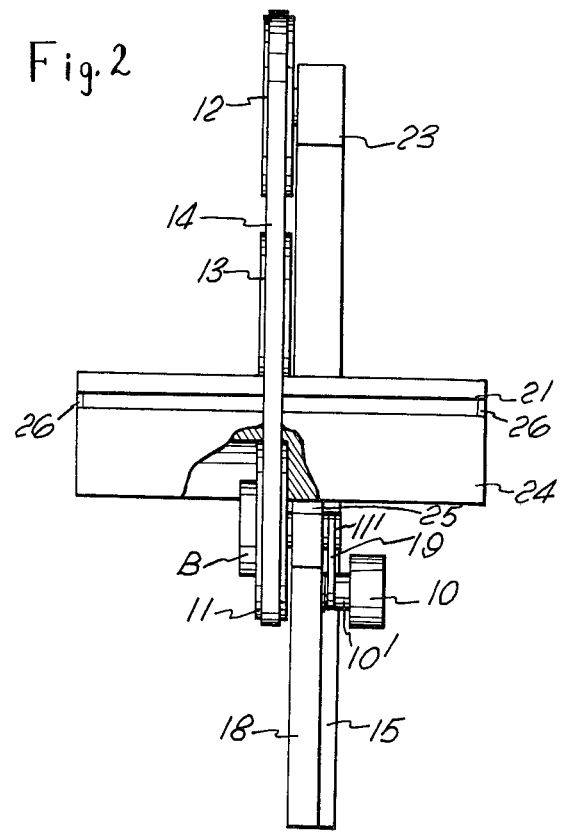
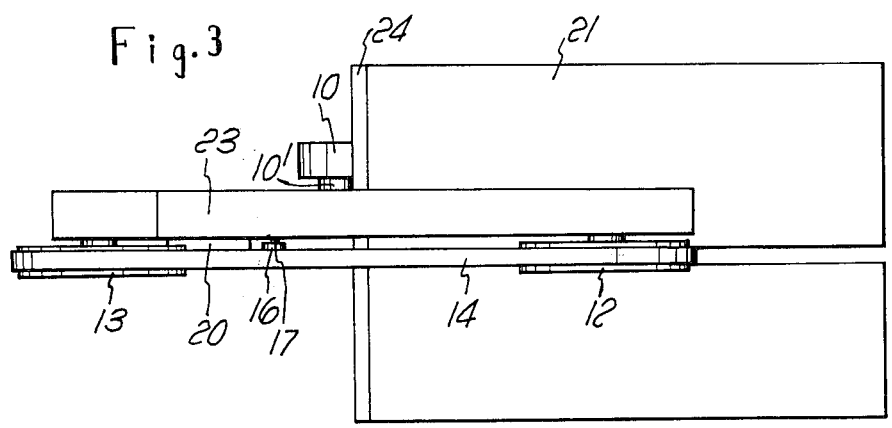

4,117,752

EMERGENCY SYSTEM FOR STOPPING A BAND BLADE OF A CUTTING APPARATUS

This invention relates to an emergency system for stopping an endless band blade of cutting apparatus immediately when part of the human body comes into contact with the band blade so as to avoid injuries to the human body and to thereby greatly enhance the safety of operation of the cutting apparatus.

BACKGROUND OF THE INVENTION AND PRIOR ART

Ideally, a cutting apparatus employing an endless band type blade must have the following features. First, the band blade must be able to be driven at a high speed with a high torque. Second, the band blade must be able to be stopped instantaneously upon the contact of part of the human body with the band blade. Third, the band blade must be able to be stopped reliably at any time.

Cutting apparatus heretofore widely used is not equipped with means for stopping the band blade upon the detection of contact of the human body with the band blade, but rather are merely provided with a casing for covering part of the band blade some distance above a table for supporting the workpiece. Since the casing does not cover the blade at the position immediately above the table where the finger, hand or like part of the operator is most liable to contact the band blade when the workpiece is being cut as it is pushed toward the band blade, the body part sometimes inadvertently contacts the band blade which is being driven at a high speed and is thereby cut very quickly. Thus, the conventional apparatus is very dangerous to operate.

OBJECT AND BRIEF SUMMARY OF THE INVENTION

It is the object of the present invention to provide a system which fulfills the foregoing requirements by utilizing the electric charge potential of the human body. This charge is transmitted through the band blade acting as a conductor and is reliably amplified and is applied to relays to stop the drive means for the band blade and to actuate brake means for the band blade at the same time.

The emergency stopping system of this invention is incorporated in a cutting apparatus comprising a plurality of pulleys mounted on a base and a band blade reeved around the pulleys and adapted to be driven by the pulleys at a high speed to cut a workpiece placed on a work table. A bearing held in contact with the band blade at all times is mounted on the base to electrically connect the band blade to an amplifier the output terminals of which are coupled to rely means. The contacts of the relay means are connected in the power supply of the drive means for the band blade and to brake means. When a human body comes into contact with the band blade, the electrical charge potential of the human body is amplified and fed to the relay means, whereupon the energized relay means operates to stop the drive means and actuates the brake means at the same time to immediately stop the band blade.

BRIEF DESCRIPTION OF THE DRAWINGS

The invention will now be described in connection with the accompanying drawings, in which:

FIG. 2 is a front view of the cutting apparatus of FIG. 1;

FIG. 3 is a plan view of the apparatus of FIG. 1;

DESCRIPTION OF THE PREFERRED EMBODIMENTS

Figure 1:
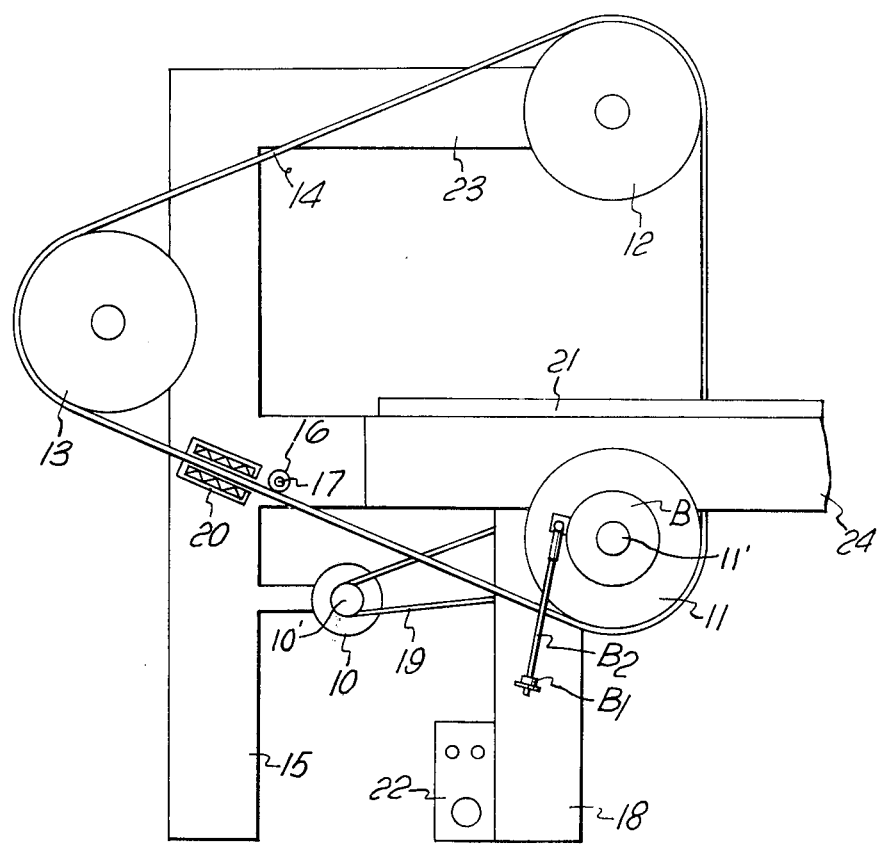
FIG. 1 is a side elevation of a cutting apparatus incorporating the emergency system for stopping a band blade according to the present invention.

FIGS. 1 to 3 show a cutting apparatus incorporating an emergency system according to this invention for stopping a band blade. A base 24 is provided with an arm 23 thereabove and is placed on support posts 15 and 18. The arm 23 has a pulley 12 rotatably mounted on its outer end. A pulley 11 is mounted on a lower portion of the base 24 immediately below the pulley 12. Another pulley 13 is mounted on a base portion of the arm 23. An endless band blade 14 of thin steel is reeved around the pulleys 11, 12 and 13. A work table 21 for supporting a workpiece is fixedly mounted on the upper surface of the base 24 and the blade 14 passes through the work table. A bearing 16 of electrically conducting materials rotatably mounted on a shaft 17 on the base 24 is held in contact with the band blade 14 at all times for electrically connecting the band blade 14 to an amplifier A (see FIG. 5). A motor 10 mounted on post 15 has a drive shaft 10' which is operatively connected to the shaft 11' of the pulley 11 by a drive belt 19. The post 18 is further provided with a brake control box 22 and an electromagnetic brake holder $B_1$. An electromagnetic clamp brake 20 mounted on the base 24 is adapted to stop the band blade 14 by moving into clamping engagement therewith. A support rod $B_2$ secured to the brake holder $B_1$ fixedly supports an electromagnetic brake B at its upper end. The electromagnetic brake B, when actuated, grips a brake plate integral with the pulley 11 to brake the pulley 11 to a halt.

Figure 5:
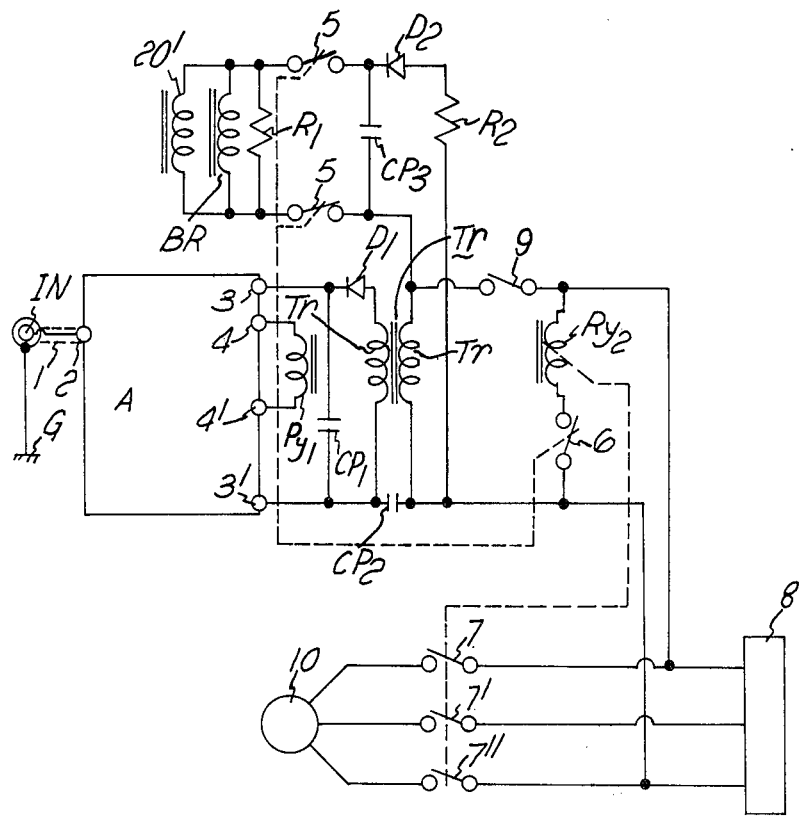
FIG. 5 is an electric circuit diagram of the emergency stopping system of this invention.

The electrical part of the emergency stopping system of this invention has a structure as shown in FIG. 5.

The bearing 16 is connected by a shielded wire 1 to an input terminal 2 of the amplifier A. The motor 10 is connected to a three-phase a.c. power supply 8 by way of rely contacts 7, 7' and 7". Provided between and connected in series with two voltage terminals of the power supply 8 are primary winding $Tr_1$ of a transformer Tr and a switch 9 as well as a relay contact 6 and a relay winding $Ry_2$ for operating the relay contacts 7, 7' and 7". One terminal of the secondary winding $Tr_2$ of the transformer Tr is connected to a positive voltage terminal 3 of the amplifier A with a rectifying diode $D_1$ connected therebetween in the forward direction. The other voltage terminal of the secondary winding $Tr_2$ is connected to a negative voltage terminal 3' of the amplifier A. A smoothing capacitor $CP_1$ is connected between the two voltage terminals 3 and 3'. A relay winding $Ry_1$ for operating the relay contact 6 is connected between the output terminals 4 and 4' of the amplifier A. A capacitor $CP_2$ is connected to the terminal of the secondary winding $Tr_2$ connected to the negative voltage terminal 3' and the terminal of the primary winding $Tr_1$ corresponding to that terminal of $Tr_2$.

Interposed between and connected in series with the two terminals of the primary winding $Tr_1$ are resistor $R_2$, a rectifying diode $D_2$, relay contacts 5 and 5' which are operated by the relay winding $Ry_1$, and a brake winding BR for actuating the electromagnetic brake B. A smoothing capacitor $CP_3$, a resistor $R_1$ and a brake winding 20' for operating the electromagnetic clamp brake 20 are connected in parallel to the brake winding BR.

In the cutting apparatus including the emergency stopping system of this invention having the above described structure, the band blade 14 is usually driven at a specified speed by the pulley 11 which is rotated by the motor 10. The workpiece placed on the table 21 is cut by being pushed toward the blade 14 by the operator.

If the operator inadvertently brings his hand, finger or like part of the body into contact with the band blade 14, the electric charge potential of the body is transmitted by way of the blade 14 and bearing 16 to the input terminal 2 of the amplifier A, in which the charge is amplified to a predetermined level and then fed to the relay winding $Ry_1$ connected between the output terminals 4 and 4', closing the relay contacts 5, 5' and 6 and consequently energizing the brake windings BR and 20' and relay winding $Ry_2$. The relay winding $Ry_2$ in turn opens the relay contacts 7, 7' and 7", whereupon the current supply to the motor 10 is interrupted and the motor is stopped.

Since the relay contacts 7, 7' and 7" are opened simultaneously with the energization of the brake windings Br and 20', the two brakes B and 20 are actuated simultaneously with the stopping of the motor 10. Thus, the electromagnetic brake B grips the brake plate integrally secured to the pulley 11, bringing the pulley 11 to a stop, while the electromagnetic clamp brake 20 clamps the band blade 14 to stop the band blade 14. Because the motor 10, pulley 11 and band blade 14 are all stopped at the same time, the band blade 14 can be braked with improved efficiency, without being permitted to continue to move due to inertia of the blade, the pulleys and the motor. In this way, the band blade immediately stops without causing injuries to the human body which would otherwise result from the contact of the human body with the band blade 14.

The same advantage as above can be achieved if a single-phase a.c. power supply is used in place of the three-phase a.c. power supply.

Figure 4:
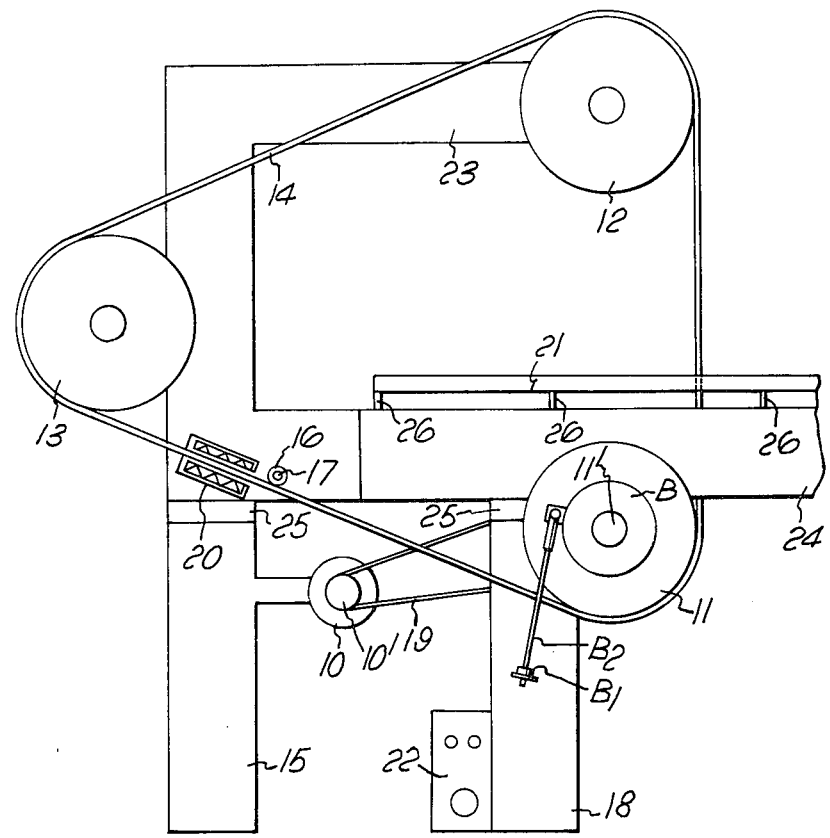
FIG. 4 is a side elevation of a cutting apparatus incorporating another embodiment of this invention.

FIG. 4 shows another embodiment which operates to stop the band blade 14 with improved effectiveness and stability and which is free from the possibility of malfunction. Insulator plates 25 are provided between the base 24 and the support posts 15 and 18 to completely insulate the base 24 from the floor on which the posts 15 and 18 stand. Also provided between the base 24 and the work table 21 are insulator legs 26 for completely insulating the base 24 from the table 21. These insulators make the present system operable free of any influence produced by other electric appliances. As a result, the electric charge potential of the human body alone is applied to the amplifier A only when the body contacts the blade 14. The emergency stopping system is therefore accurately operable free of the possibility that it will operate even though the human body is out of contact with the band blade and consequently reduce the cutting efficiency of the apparatus.

What is claimed is:

1. In a cutting apparatus having pulleys rotatably mounted on a base which is in turn mounted on a support and the pulleys driving a band blade reeved therearound by means of a motor driving one of the pulleys and a power supply for said apparatus, an emergency system for stopping the band blade comprising an amplifier having an input in direct electric contact with the band blade, first relay means electrically coupled to the amplifier, said first relay means being electrically coupled between the power supply and the motor and operated for disconnecting said power supply and said motor when the amplifier receives and amplifies the electric charge potential of a human body only when the body contacts said blade, an electrically actuated brake mounted on said support and engagable with the driven pulley for braking the pulley, a further electrically actuated brake mounted on said base and engagable with said band blade for braking the band blade, and second relay means electrically coupled to the amplifier and electrically coupled between said power supply and said brakes and actuated to electrically connect said power supply and said brakes when the amplifier receives and amplifies the electric charge potential of a human body when the body contacts the blade.

2. An emergency system as claimed in claim 1 wherein said amplifier and said first and second relay means are connected for being actuated simultaneously for stopping said motor and actuating said brakes.

3. An emergency system as claimed in claim 1 further comprising an insulator between said support and between said base, and said cutting apparatus further having a work table through which the band blade runs, and a further insulator between said base and said work table.

4. An emergency system as claimed in claim 1 wherein a bearing of electrically conductive material is mounted on said base and is held in contact with the band blade at all times and is electrically connected to the amplifier.

* * * * *